Aug. 1, 1967  M. R. SCHOTT  3,333,598

ROTARY JOINTS FOR HYDRAULIC CIRCUITS

Filed Oct. 19, 1964  2 Sheets-Sheet 1

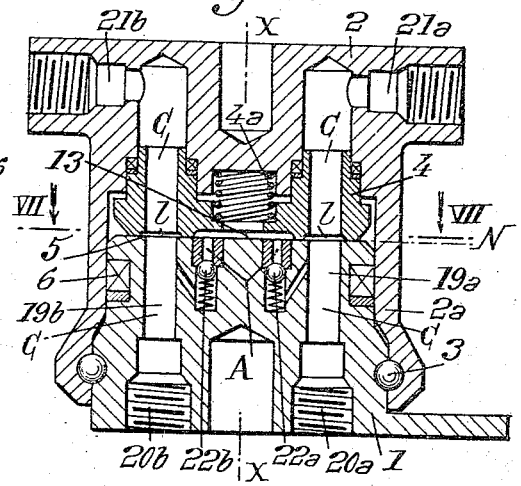
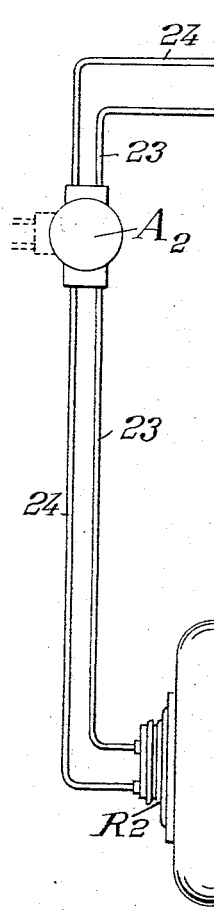
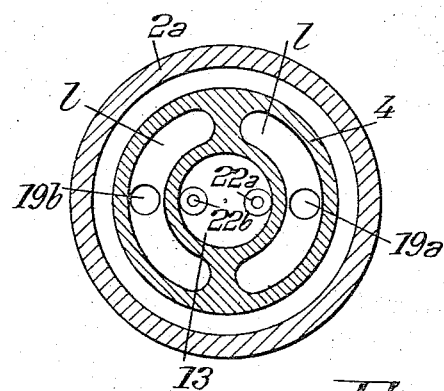
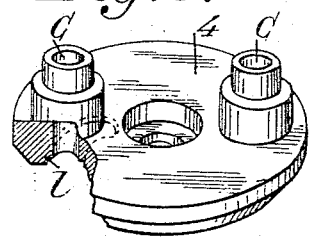

United States Patent Office 3,333,598
Patented Aug. 1, 1967

1

3,333,598
ROTARY JOINTS FOR HYDRAULIC CIRCUITS
Marcel René Schott, Colombes, France, assignor to Societe d'Exploitation des Materiels Hispano-Suiza, Bois-Colombes, Seine, France, a society of France
Filed Oct. 19, 1964, Ser. No. 404,820
Claims priority, application France, Oct. 29, 1963, 952,212
6 Claims. (Cl. 137—312)

The present invention relates to rotary joints for interconnecting at least one pair of pipes, one for liquid under a first pressure and the other for liquid under a second pressure, with another pair of pipes also comprising a first pressure liquid pipe and a second pressure liquid pipe.

The chief object of the invention is to provide a rotary joint of this type which is better adapted to meet the requirements of practice than those known up to this time.

The joint with which the present invention is concerned comprises two parts fitting against each other along a common plane and pivoted to each other about an axis perpendicular to said plane, each of said parts being provided with a passage portion transverse to said plane and adapted to be connected with one of said first pressure pipes respectively, and with a passage portion transverse to said plane adapted to be connected with one of said second pressure pipes respectively, the two passage portions of said two parts that are connected respectively with said two pipes at the first pressure being arranged to communicate together in said plane irrespective of the relative positions of said two parts about said axis, within a given range of relative rotation of said two parts about said axis, and the two passage portions of said two parts that are connected together respectively with said two pipes at the second pressure being arranged to communicate together in said plane irrespective of the relative positions of said two parts about said axis, within said range of relative rotation.

According to the present invention, said parts form between themselves a chamber extending along said plane and communicating with said passage portions through unidirectional means to said passage portions, and, in operation, the difference of pressure between said chamber and the passage portion at lower pressure is lower than the difference of pressure between said chamber and the external atmosphere.

Preferred embodiments of the present invention will be hereinafter described with reference to the appended drawings, given merely by way of example, and in which:

FIG. 5 shows another type of apparatus controlled by a hydraulic circuit provided with a rotary joint made according to a second embodiment of the present invention;

FIG. 6 is a sectional view on an enlarged scale of the rotary joint of FIG. 5 along an axial plane;

FIG. 7 is a cross sectional view on the line VII—VII of FIG. 6;

2

Figure 1:
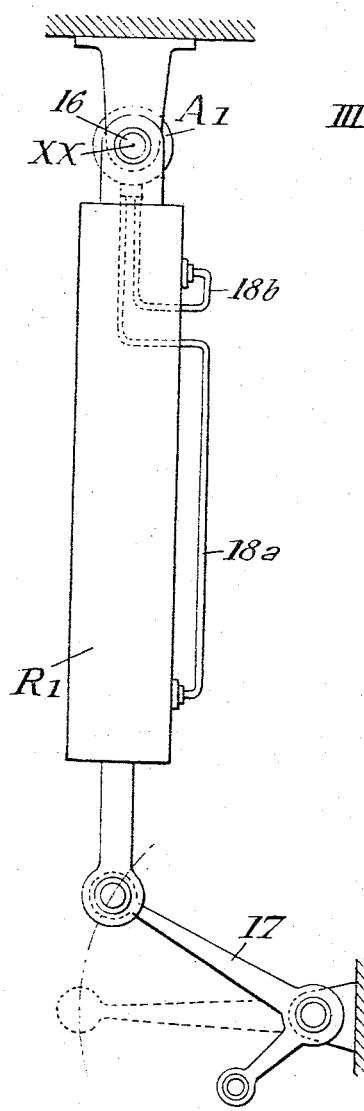
FIG. 1 is an elevational view showing a first type of apparatus controlled by a hydraulic circuit provided with a rotary joint made according to a first embodiment of the invention.

FIG. 8 is a perspective view with parts cut away of one of the essential elements of the articulations of FIGS. 6 and 7; and FIG. 9 is an explanatory view concerning the embodiment of FIGS. 5 to 8.

The joint according to the present invention comprises at least two parts 1 and 2 having cooperating flat faces adjoining each other along a common plane N and in which high pressure and low pressure connections are provided, these two pieces 1 and 2 being rotatable with respect to each other about an axis X—X perpendicular to said common plane N.

A circular row of balls 3 is provided between parts 1 and 2, these balls fitting in grooves located opposite each other and provided respectively in part 1 and in a projection 2a rigid with part 2 and which surrounds part 1.

Each of the passages C can be subjected to a high or to a low pressure, the other passage C being then subjected to a low or a high pressure, respectively.

On the other hand, means are provided for causing the leaks coming from that of said passages C which is subjected to the high pressure, at the level of common plane N to pass into the channel C which is then subjected to the low pressure.

Said means consist, in both of the embodiments shown by the drawings, of check valves A leading from a central chamber 13 located between parts 1 and 2, substantially in plane N, to passages C.

The functional leaks in such a joint may be reduced to a minimum by providing, in the walls of each of the portions of channels C located in one of the pieces 1 and 2, for instance in piece 2, a sliding sleeve 4 arranged in such manner that the resultant of the forces resulting from the pressure of the liquid and acting on said sleeve applies it against the plane face 5 of the other piece 1.

In other words sleeve 4 is applied by the pressure of the liquid against plane face 5.

This result may be obtained by suitably choosing the relative dimensions of the end cross sections of sleeve 5. The force with which sleeve 4 is applied against face 5 may be further increased by making use of a spring 4a (for instance a helical spring or a resilient washer) the action of which is independent of the pressure existing in the system.

Of course the high pressure and low pressure channels provided respectively in pieces 1 and 2 must remain opposite each other for all relative angular positions of said pieces 1 and 2.

On the other hand, it will be of interest to provide at least one packing joint 6 for preventing any leakage between the low pressure channel of the joint and the outside. In the case above mentioned, said packing joint is interposed between a part 1 and the tubular extension 2a of part 2.

Concerning the internal arrangement of the joint and in particular the arrangement of the high pressure and low pressure connections, this arrangement will be made in accordance with the nature of the receiving apparatus R and of this mode of operation.

Some examples will now be given.

According to the embodiments of FIGS. 1 to 4 the receiver apparatus $R_1$ consists of a double acting jack or hydraulic motor having its casing pivotally mounted about an axis 16, the piston of said jack being connected to a pivoting rod 17. Each of the chambers of the jack may be subjected to a high pressure or a low pressure, respectively, through two pipes 18a and 18b, respectively, owing to a joint according to the invention and designated by reference letter $A_1$ (FIG. 1).

This type of receiver apparatus requires the possibility of angular displacement of jack $R_1$ only through an angle of some degrees (for instance 10°) but it requires the possibility of connecting each of the pipes 18a and 18b either with the high pressure or with the low pressure.

Figure 2:
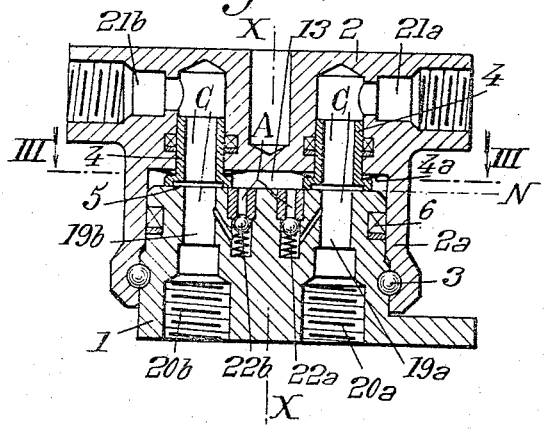
FIG. 2 is a sectional view on an enlarged scale of this rotary joint along an axial plane.
Figure 3:
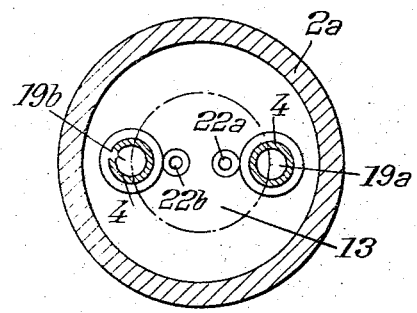
FIG. 3 is a cross sectional view on the line III—III of FIG. 2.
Figure 4:
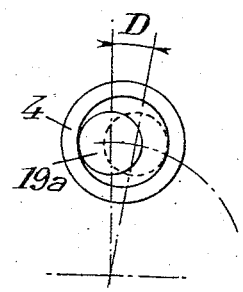
FIG. 4 is an explanatory diagram relating to FIGS. 2 and 3.

Advantageously joint $A_1$ is of the type illustrated by FIGS. 2, 3 and 4.

In this construction each of the pieces 1 and 2 comprises two passage portions 19a and 19b, respectively, parallel to axis X—X and disposed symmetrically with respect to said axis. These passage portions communicate respectively with connection passages 20a and 21a on the one hand and 20b and 21b on the other hand. Preferably, as shown, connection passages 20a and 20b are parallel to axis X—X and connection passages 21a and 21b are perpendicular to said axis. Two sleeves 4 are provided in passage portions 19a and 19b.

Around 19a and 19b and at the level of the plane N along which pieces 1 and 2 join each other, there is provided a chamber 13 connected to said passage portions 19a and 19b through two check valves 22a and 22b respectively, each of these check valves consisting of a ball and a spring.

When passages 20a, 19a and 21a are connected with the high pressure, passages 20b, 19b and 21b are connected with the low pressure and the leaks from the high pressure passage, which have passed into chamber 13, are evacuated past check valve 22b into the low pressure passages.

When passages 20b, 19b, 21b are connected with the high pressure, the arrangement is reversed and the leaks from said high pressure passages are evacuated past check valve 22a into passage 19a.

It should be noted that it will be necessary, as shown by FIG. 4, to give the internal diameter of sleeves 4 in plane N and the inner diameters of channels 19a and 19b in the same plane, values such that for the maximum angle D of rotation of parts 1 and 2 with respect to each other about axis X—X, the channel, 19a or 19b, that is considered is continuous.

In the construction of FIGS. 5 to 9, the receiver apparatus $R_2$ is a hydraulic brake adapted to act upon the wheel of a retractable landing gear.

The hydraulic brake is normally controlled through high pressure pipe 23 and low pressure pipe 24 connected together through a rotating joint according to the invention, shown at $A_2$ in FIG. 5.

If, for some reasons (braking, deterioration of the high pressure pipe or defective operation of the high pressure pump for instance), pipe 23 is no longer fed with liquid under high pressure, this braking mechanism can be actuated through an emergency high pressure circuit 25, which, through a suitably controlled valve 26, is connected with the low pressure pipe 24. This pipe then becomes the high pressure pipe whereas pipe 23, which precedingly was at high pressure, becomes the low pressure pipe. This type of receiver apparatus requires, from joint $A_2$, a possibility of important angular displacement (averaging for instance 150°). Furthermore, as above stated, pipes 23 and 24 must be capable of acting, respectively, as high pressure pipe and low pressure pipe in normal utilization and as low pressure pipe and high pressure pipe in case of emergency.

Joint $A_2$ is of the type illustrated by FIGS. 6, 7, 8 and 9. This construction is similar to that above described with reference to FIGS. 2 and 3 with the difference that, in the case of joint $A_2$, there is provided a single sleeve 4 coaxial with parts 1 and 2, said sleeve 4 comprising, in plane N, two elongated slots $l$ extending substantially along a half circumference and which permit of ensuring the continuity of passages 19a or 19b in plane N for all relative position of parts 1 and 2 as illustrated by FIG. 8.

In a general manner, while the above description discloses what are deemed to be practical and efficient embodiments of the present invention, said invention is not limited thereto as there might be changes made in the arrangement, disposition and form of the parts without departing from the principle of the invention as comprehended within the scope of the appended claims.

What I claim is:

1. A rotary joint for connecting together, on the one hand two pipes at a first pressure and, on the other hand two pipes at a second pressure, different from the first pressure, said joint comprising two parts fitting against each other along a common plane and pivoted to each other about an axis perpendicular to said plane, each of said parts being provided with a passage portion transverse to said plane adapted to be connected with one of said first pressure pipes respectively and with a passage portion transverse to said plane adapted to be connected with one of said second pressure pipes respectively, the two passage portions of said two parts that are connected respectively with said two pipes at the first pressure being arranged to communicate together in said plane irrespective of the relative positions of said two parts about said axis, within a given range of relative rotation of said parts about said axis, and the two passage portions of said two parts that are connected respectively with said two pipes at the second pressure being arranged to communicate together in said plane irrespective of the relative positions of said two parts about said axis within said range of relative rotation of said parts, said parts forming between themselves a chamber extending along said plane, at least one of said parts being provided with two communication conduits between said chamber and said passage portions respectively, and unidirectional means in said communication conduits for permitting the flow of liquid only from said chamber to said passage portions in conditions such that, in operation, the difference of pressure between said chamber and the passage portion that is at lower pressure is lower than the difference of pressure between said chamber and the external atmosphere.

2. A rotary joint according to claim 1 wherein said unidirectional means consist of check valves.

3. A rotary joint for connecting together, on the one hand two pipes at a first pressure and, on the other hand two pipes at a second pressure, different from the first pressure, said joint comprising two parts fitting against each other along a common plane and pivoted to each other about an axis perpendicular to said plane, each of said parts being provided with a passage portion transverse to said plane adapted to be connected with one of said first pressure pipes respectively and with a passage portion transverse to said plane adapted to be connected with one of said second pressure pipes respectively, the two passage portions of said two parts that are connected respectively with said two pipes at the first pressure being arranged to communicate together in said plane irrespective of the relative positions of said two parts about said axis, within a given range of relative rotation of said parts about said axis, and the two passage portions of said two parts that are connected respectively with said two pipes at the second pressure being arranged to communicate together in said plane irrespective of the relative positions of said two parts about said axis within said range of relative rotation of said parts, said parts forming between themselves a chamber extending along said plane, at least one of said parts being provided with communication conduits between said chamber and said passage portions respectively, and unidirectional means in said communication conduits for permitting the flow of liquid only from said chamber to said passage portions in conditions such that, in operation, the difference of pressure between said chamber and the passage portion that is at lower pressure is lower than the difference of pressure between said chamber and the external atmosphere, and a sliding sleeve in each of said passage portions located in one of said parts, said sliding sleeve being arranged in such manner that the resultant of the forces exerted by the liquid under pressures on the walls of said sleeve applies the latter against the flat face, located in said common plane, of the other of said parts.

4. A rotary joint according to claim 1 further comprising a row of balls engaged in two opposite grooves provided opposite each other respectively in the tubular outer wall of a portion of one of the parts and in the inner wall of a cylindrical extension of the other part coaxially surrounding said first mentioned part tubular portion.

5. A rotary joint according to claim 1 further comprising packing means between said parts for preventing liquid from flowing out from said chamber to the outside.

6. A rotary joint according to claim 3 further comprising a spring for resiliently forcing said sleeve against the second mentioned part.

References Cited
UNITED STATES PATENTS

| | | | |
|---|---|---|---|
| 803,648 | 11/1905 | Williams | 285—131 |
| 1,497,652 | 6/1924 | Browne | 285—13 |
| 1,582,246 | 4/1926 | Buchanan | 285—13 XR |
| 2,384,281 | 9/1945 | Carter | 285—13 |
| 2,910,309 | 10/1959 | Snyder et al. | 285—137 XR |

WILLIAM F. O'DEA, *Primary Examiner.*

R. GERARD, *Assistant Examiner.*